United States Patent
Olofsson et al.

(10) Patent No.: US 9,744,997 B2
(45) Date of Patent: Aug. 29, 2017

(54) B-PILLAR AND METHOD OF MANUFACTURING IT

(71) Applicant: Gestamp Hardtech AB, Lulea (SE)

(72) Inventors: Emil Olofsson, Pitea (SE); Jan Larsson, Lulea (SE); Hans Bodin, Sunderbyn (SE)

(73) Assignee: Gestamp Hardtech AB, Lulea (SE)

( * ) Notice: Subject to any disclaimer, the term of this patent is extended or adjusted under 35 U.S.C. 154(b) by 468 days.

(21) Appl. No.: 14/414,912

(22) PCT Filed: May 24, 2013

(86) PCT No.: PCT/SE2013/000085
§ 371 (c)(1),
(2) Date: Jan. 15, 2015

(87) PCT Pub. No.: WO2014/017961
PCT Pub. Date: Jan. 30, 2014

(65) Prior Publication Data
US 2015/0210320 A1     Jul. 30, 2015

(30) Foreign Application Priority Data
Jul. 25, 2012 (SE) ..................... 1200459

(51) Int. Cl.
    *B62D 25/04*     (2006.01)
    *B23K 31/02*     (2006.01)
    *C22C 38/00*     (2006.01)

(52) U.S. Cl.
    CPC .............. *B62D 25/04* (2013.01); *B23K 31/02* (2013.01); *C22C 38/00* (2013.01); *Y10T 428/12375* (2015.01)

(58) Field of Classification Search
CPC ..................................................... B62D 25/04
See application file for complete search history.

(56) References Cited

U.S. PATENT DOCUMENTS

2008/0001434 A1     1/2008    Henkelmann

FOREIGN PATENT DOCUMENTS

| DE | 10028716 | 6/2001 |
|---|---|---|
| EP | 0953495 | 11/1999 |
| EP | 1170197 | 1/2002 |
| WO | WO2008/024042 | 2/2008 |

*Primary Examiner* — Adam Krupicka
(74) *Attorney, Agent, or Firm* — Mark P. Stone

(57) ABSTRACT

A B-pillar is shaped from a sheet blank (20,21) into a hat profile with a central flange (12), two sides (13,14) and two side flanges (15,16), and it has, over a portion of its length, a reinforcing sheet (21) that make the B-pillar have double sheets. The reinforcing sheet (21) extends out over the side flanges (15,16) over at least ¼ of its length and narrows down at both its ends so that it does not extend out over the side flanges over part of its length.

20 Claims, 2 Drawing Sheets

B-PILLAR AND METHOD OF MANUFACTURING IT

AREA OF THE INVENTION

The invention relates to a B-pillar that is formed by a plate blank to a hat profile with a central flange, two sides and two side flanges and has a reinforcement plate over part of its length that forms a double plate B-pillar.

BACKGROUND OF THE INVENTION

EP 0953495 shows a B-pillar of this type.
WO 2008/024042 shows a B-pillar formed by a blank consisting of two parts that are welded together with overlap and are formed and hardened with press hardening.

OBJECT OF THE INVENTION AND BRIEF DESCRIPTION OF THE INVENTION

It is an object of the invention to make a B-pillar available that has good collision performances and reduced weight. This is achieved when the reinforcement plate extends over at least ¼ of its length over the side flanges and narrows down on both of its ends so that it does not extend out over the side flanges over a part of its length.

SHORT DESCRIPTION OF THE DRAWINGS

Figure 1:
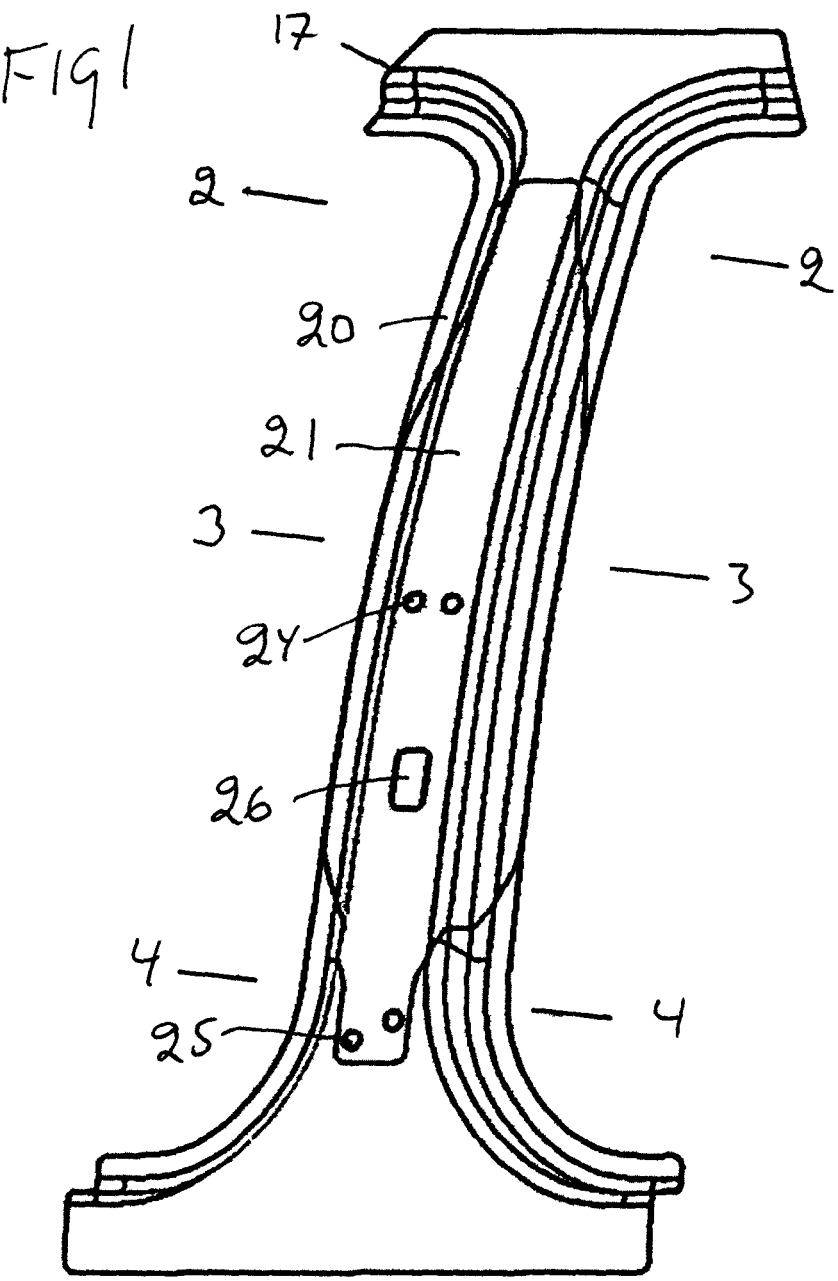
Figure 2:
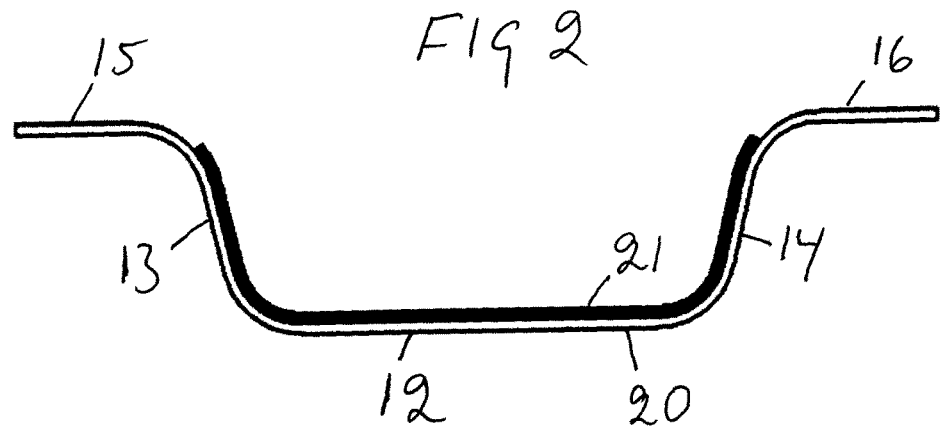
Figure 3:
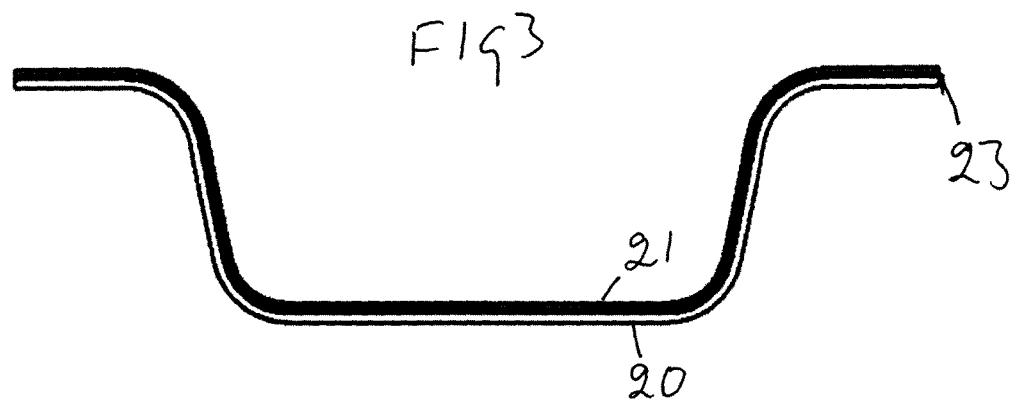
Figure 4:
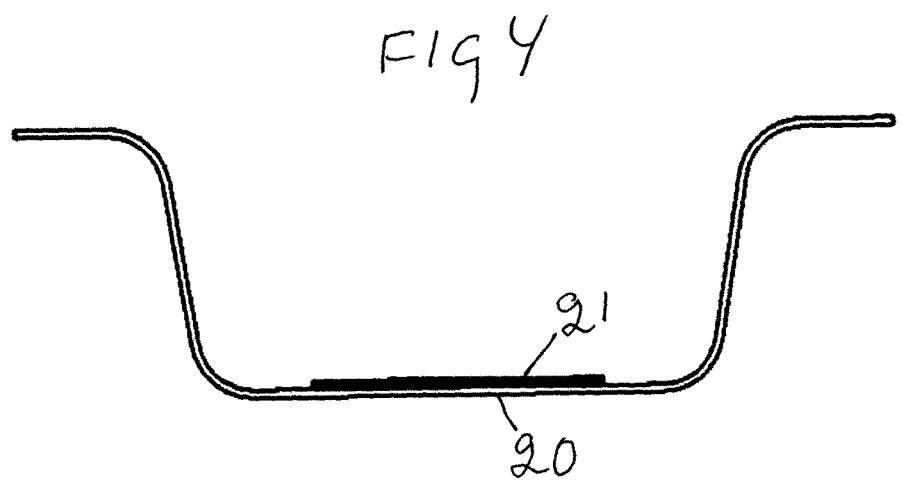

FIG. 1 shows as an example a B-pillar in accordance with the invention viewed from inside the vehicle.
FIG. 2 is a section taken along line 2 in FIG. 1.
FIG. 3 is a section taken along line 3 in FIG. 1.
FIG. 4 is a section taken along line 4 in FIG. 1.

DESCRIPTION OF THE SHOWN EXAMPLE OF THE INVENTION

The figures show the load-receiving unit 11 of a B-pillar, that is, the actual B-pillar. It consists of a hat profile with a central flange 12, two ribs 13, 14 and two side flanges 15, 16. The ends of the profile are widened to two fastening parts 17, 18, of which the upper one 17 is adapted to be welded to a longitudinally running roof beam and the lower one is adapted to be welded to a longitudinally running floor beam. Usually, but not necessarily, a cap is welded to the side flanges. Furthermore, the outer panel of the vehicle is welded to the other side of the flanges.

The B-pillar is thermoformed and hardened from a plane plate blank with press hardening technology, that is, a plane plate blank is heated to austenite temperature and is formed in a cooled-down tool pair in which the formed product is allowed to lie and harden with the tool as fixture. The plane blank consists of a plate 20 that has a reinforcement plate 21, usually designated as a "patch". The two plates are welded together, e.g., by points distributed over the entire surface and are formed and hardened together. The reinforcement plate 21 extends over the entire width of the blank over half or more of its length or at least over a quarter or more of its length and both ends narrow down. The finished B-pillar therefore forms a double plate on part of the side flanges but the reinforcement plate narrows down so that its ends only cover the central flange. The narrowed-down sections from the blank's edge take up together at least one third of the length of the reinforcement plate. The edge of the reinforcement plate 21 is seam welded before or after the forming and hardening, as is indicated with 23 in FIG. 3 at least in the part of the edge that coincides with the edge of the plate 20.

Holes 24 are made in the blank for fastening the upper door hinge where the reinforcement plate covers the entire width of the blank. Holes 25 for fastening the lower door hinge are made in the lower end of the blank where the reinforcement plate covers only the central flange. A hole 26 is also made for running cables through and possibly also other holes are made. The holes are thus made in unhardened plate but certain holes can be cut with a laser in the finished product. The reinforcement plate can have recesses or holes for reducing its weight and these holes or recesses are then adapted in order to give the pillar the desired deformation properties.

The invention claimed is:

1. A B-pillar that is formed by a plate blank (20, 21) to a hat profile with a central flange (12), two sides (13, 14) and two side flanges (15, 16) and has a reinforcement plate (21) over part of its length that forms a double plate B-pillar, characterized in that
the reinforcement plate (21) extends over at least ¼ of its length over the side flanges (15, 16) and narrows down at both its ends so that it does not extend out over the side flanges over part of its length.

2. The B-pillar according to claim 1, characterized in that the reinforcement plate (21) extends out over the side flanges (15, 16) at least over half its length.

3. The B-pillar according to claim 1, characterized in that the reinforcement plate (21) narrows down from the edge of the side flanges in both directions over a length that is together at least ⅓ of the length of the reinforcement plate.

4. The B-pillar according to claim 1, characterized by fastening holes (24) for an upper door hinge in the part of the hat profile where the reinforcement plate extends out over the side flanges.

5. The B-pillar according to claim 1, characterized by fastening holes (26) for a lower door hinge in the part where the reinforcement plate does not extend out over the side flanges.

6. The B-pillar according to claim 1, characterized in that the ends of the reinforcement plate (21) only cover the central flange (12).

7. The B-pillar according to claim 2, characterized in that the reinforcement plate (21) narrows down from the edge of the side flanges in both directions over a length that is together at least ⅓ of the length of the reinforcement plate.

8. The B-pillar according to claim 7, characterized in that the ends of the reinforcement plate (21) only cover the central flange (12).

9. The B-pillar according to claim 2, characterized by fastening holes (26) for a lower door hinge in the part where the reinforcement plate does not extend out over the side flanges.

10. The B-pillar according to claim 2, characterized in that the ends of the reinforcement plate (21) only cover the central flange (12).

11. The B-pillar according to claim 3, characterized in that the ends of the reinforcement plate (21) only cover the central flange (12).

12. The B-pillar according to claim 4, characterized in that the ends of the reinforcement plate (21) only cover the central flange (12).

13. The B-pillar according to claim 5, characterized in that the ends of the reinforcement plate (21) only cover the central flange (12).

14. A method of manufacturing a B-pillar according to claim 1 by forming a blank in a plane plate, placing the blank together with a reinforcement plate (21) and welding the reinforcement plate fast, characterized in that a reinforcement plate (21) is selected that covers over at least ¼ of its length the entire width of the blank and whose both ends narrow down from the edge of the blank together over at least ⅓ of the length of the blank.

15. The method according to claim 14, characterized in that the blank is heated to austenite temperature and is formed in a cooled-down tool pair and that the formed product is allowed to harden in the forming tool pair.

16. A method of manufacturing a B-pillar according to claim 2 by forming a blank in a plane plate, placing the blank together with a reinforcement plate (21) and welding the reinforcement plate fast, characterized in that a reinforcement plate (21) is selected that covers over at least ¼ of its length the entire width of the blank and whose both ends narrow down from the edge of the blank together over at least ⅓ of the length of the blank.

17. A method of manufacturing a B-pillar according to claim 3 by forming a blank in a plane plate, placing the blank together with a reinforcement plate (21) and welding the reinforcement plate fast, characterized in that a reinforcement plate (21) is selected that covers over at least ¼ of its length the entire width of the blank and whose both ends narrow down from the edge of the blank together over at least ⅓ of the length of the blank.

18. A method of manufacturing a B-pillar according to claim 4 by forming a blank in a plane plate, placing the blank together with a reinforcement plate (21) and welding the reinforcement plate fast, characterized in that a reinforcement plate (21) is selected that covers over at least ¼ of its length the entire width of the blank and whose both ends narrow down from the edge of the blank together over at least ⅓ of the length of the blank.

19. A method of manufacturing a B-pillar according to claim 5 by forming a blank in a plane plate, placing the blank together with a reinforcement plate (21) and welding the reinforcement plate fast, characterized in that a reinforcement plate (21) is selected that covers over at least ¼ of its length the entire width of the blank and whose both ends narrow down from the edge of the blank together over at least ⅓ of the length of the blank.

20. A method of manufacturing a B-pillar according to claim 6 by forming a blank in a plane plate, placing the blank together with a reinforcement plate (21) and welding the reinforcement plate fast, characterized in that a reinforcement plate (21) is selected that covers over at least ¼ of its length the entire width of the blank and whose both ends narrow down from the edge of the blank together over at least ⅓ of the length of the blank.

* * * * *